(12) United States Patent
Yoon

(10) Patent No.: US 8,709,643 B2
(45) Date of Patent: Apr. 29, 2014

(54) BATTERY PACK WITH INTERCHANGEABLE CIRCUIT SUBSTRATES

(75) Inventor: Ji-Hyoung Yoon, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 827 days.

(21) Appl. No.: 12/801,767

(22) Filed: Jun. 24, 2010

(65) Prior Publication Data

US 2011/0151316 A1 Jun. 23, 2011

(30) Foreign Application Priority Data

Dec. 22, 2009 (KR) .......................... 10-2009-0129130

(51) Int. Cl.
*H01M 2/20* (2006.01)
*H01M 2/24* (2006.01)

(52) U.S. Cl.
USPC ........................................................ 429/160

(58) Field of Classification Search
USPC ........................................................ 439/627
See application file for complete search history.

(56) References Cited

U.S. PATENT DOCUMENTS

| 5,931,690 | A | * | 8/1999 | Sai et al. ......................... 439/350 |
| 2005/0250006 | A1 | | 11/2005 | Kim |
| 2005/0250386 | A1 | | 11/2005 | Kim |
| 2010/0183905 | A1 | * | 7/2010 | Matthias ........................... 429/97 |

FOREIGN PATENT DOCUMENTS

| DE | 102007031860 | * | 1/2009 | .............. H01M 2/20 |
| JP | 2005-166493 | A | 6/2005 | |
| JP | 2005166493 | * | 6/2005 | .............. H01M 2/10 |
| JP | 2010-225552 | A | 10/2010 | |
| KR | 10 2005-0106540 | A | 11/2005 | |
| KR | 10-2005-0106541 | A | 11/2005 | |

OTHER PUBLICATIONS

Korean Notice of Allowance in KR 10-2009-0129130, dated Nov. 21, 2011 (Yoon).

* cited by examiner

*Primary Examiner* — Milton I Cano
*Assistant Examiner* — Michael Dignan
(74) *Attorney, Agent, or Firm* — Lee & Morse, P.C.

(57) ABSTRACT

A battery pack including a plurality of battery cells, the battery cells including positive electrode terminals and negative electrode terminals; and a first substrate and a second substrate, the first substrate and second substrate being selectively coupleable to the positive electrode terminals and the negative electrode terminals of the plurality of battery cells, wherein the first substrate includes a first circuit for connecting the positive electrode terminals and the negative electrode terminals to connect the plurality of battery cells together in a first manner, and the second substrate includes a second circuit for electrically connecting the plurality of battery cells in a second manner different from the first manner.

17 Claims, 17 Drawing Sheets

BATTERY PACK WITH INTERCHANGEABLE CIRCUIT SUBSTRATES

BACKGROUND

1. Field

Embodiments relate to a battery pack.

2. Description of the Related Art

A battery pack used in an electric vehicle or a hybrid electric vehicle (HEV) may include a plurality of battery cells that are electrically connected so as to supply a high amount of power. The plurality of battery cells included in the battery pack may be electrically connected in series, in parallel, or in a combination of serial and parallel connections. A connection status of the battery cells may be determined in consideration of a desired output voltage of the battery pack, a use time of the battery pack, or the like. For example, when a high output is demanded, the battery cells may be connected in series; and when a long period of use is demanded over a high output, the battery cells may be connected in parallel.

Typically, in a battery pack according to the related art, the connection status of the battery cells in the battery pack is fixed; and thus, the output of the battery pack is also fixed. Since the output of the battery pack is fixed, when a situation with respect to using the battery pack is changed, it may be difficult to deal with the change. That is, if a load connected to the battery pack is changed, it may be difficult to deal with the change.

An output of the battery pack may be changed by using a direct current-to-direct current (DC-DC) converter. However, it may be difficult to use the DC-DC converter in a system demanding a high current, e.g., in a battery pack for an electric vehicle, which generally supplies high current to a load.

SUMMARY

Embodiments are directed to a battery pack, which represents advances over the related art.

It is a feature of an embodiment to provide a battery pack in which an output voltage may be easily changed without power loss At least one of the above and other features and advantages may be realized by providing a battery pack including a plurality of battery cells, the battery cells including positive electrode terminals and negative electrode terminals; and a first substrate and a second substrate, the first substrate and second substrate being selectively coupleable to the positive electrode terminals and the negative electrode terminals of the plurality of battery cells, wherein the first substrate includes a first circuit for connecting the positive electrode terminals and the negative electrode terminals to connect the plurality of battery cells together in a first manner, and the second substrate includes a second circuit for electrically connecting the plurality of battery cells in a second manner different from the first manner.

The first circuit may connect each of the positive electrode terminals together and may connect each of the negative electrode terminals together to connect the battery cells in parallel, and the second circuit may connect one of the positive electrode terminals to one of the negative electrode terminals such that the plurality of battery cells is connected in series.

The first circuit may further connect one of the positive electrode terminals to one of the negative electrode terminals such that some of the plurality of battery cells are connected in series.

The first substrate and the second substrate may include a plurality of sockets, the positive electrode terminals and the negative electrode terminals being inserted into and coupled to the plurality of sockets.

The plurality of sockets may include a plurality of fixed protrusions protruding from inner circumferences of the plurality of sockets, the fixed protrusions pressurizing and fixing the respective positive electrode terminals and negative electrode terminals with respect to the sockets.

The plurality of fixed protrusions may be formed of an elastic material, the fixed protrusions elastically pressurizing the respective positive electrode terminals or negative electrode terminals.

Each of the plurality of fixed protrusions may extend in a longitudinal direction of the plurality of sockets and may have side end portions protruding a distance and a center portion protruding a distance, the distance the side end portions protrude being less than the distance the center portion protrude.

The battery pack may further include a transport medium for selectively attaching and detaching the first substrate or the second substrate to and from the plurality of battery cells to couple and uncouple the first substrate or the second substrate to the positive electrode terminals and the negative electrode terminals.

The first substrate and the second substrate may be fixedly coupled to each other to form a substrate unit.

The substrate may include the first substrate and the second substrate formed as one body to form a substrate unit.

The transport medium may include a first driving source for selectively attaching and detaching the first substrate or the second substrate to and from the plurality of battery cells; and a second driving source for selectively moving the first substrate and the second substrate in a direction perpendicular to a direction in which the first substrate and the second substrate are moved to be attached to or to be detached from the battery cells.

The first substrate and the second substrate may have a toothed portion at adjacent side ends thereof in a longitudinal direction thereof, and the second driving source may be for driving a rotational gear that is gear-engaged with the toothed portion to move the first substrate and the second substrate.

The toothed portion may be a rack gear and the rotational gear may be a pinion gear.

The toothed portion may be a worm gear and the rotational gear may be a worm.

The first substrate and the second substrate may be coupled to each other such that respective surfaces of the first and second substrates that face the plurality of the battery cells face in opposite directions, and the transport medium may include a first driving source for selectively attaching and detaching the first substrate and the second substrate to and from the plurality of battery cells; and a second driving source for turning over the first substrate and the second substrate.

The battery pack may further include an insulator between the first substrate and the second substrate.

The first substrate and the second substrate may be formed of a flexible material, the battery pack may further include a belt surrounding the plurality of battery cells, the belt being internally coupled with the first substrate and the second substrate, and the transport medium may include a belt driving source for rotating the belt; and a pressurizing body for selectively pressing the first substrate and the second substrate to couple the first substrate or the second substrate to the positive electrode terminals and the negative electrode terminals.

At least one of the above and other features and advantages may also be realized by providing a battery pack connector for interchangeably coupling together positive electrode terminals and negative electrode terminals of a plurality of battery cells, the battery pack connector including a first substrate and a second substrate, the first substrate including a first circuit for connecting the positive electrode terminals and the negative electrode terminals to connect the plurality of battery cells together in a first manner, and the second substrate including a second circuit for electrically connecting the plurality of battery cells in a second manner different from the first manner.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
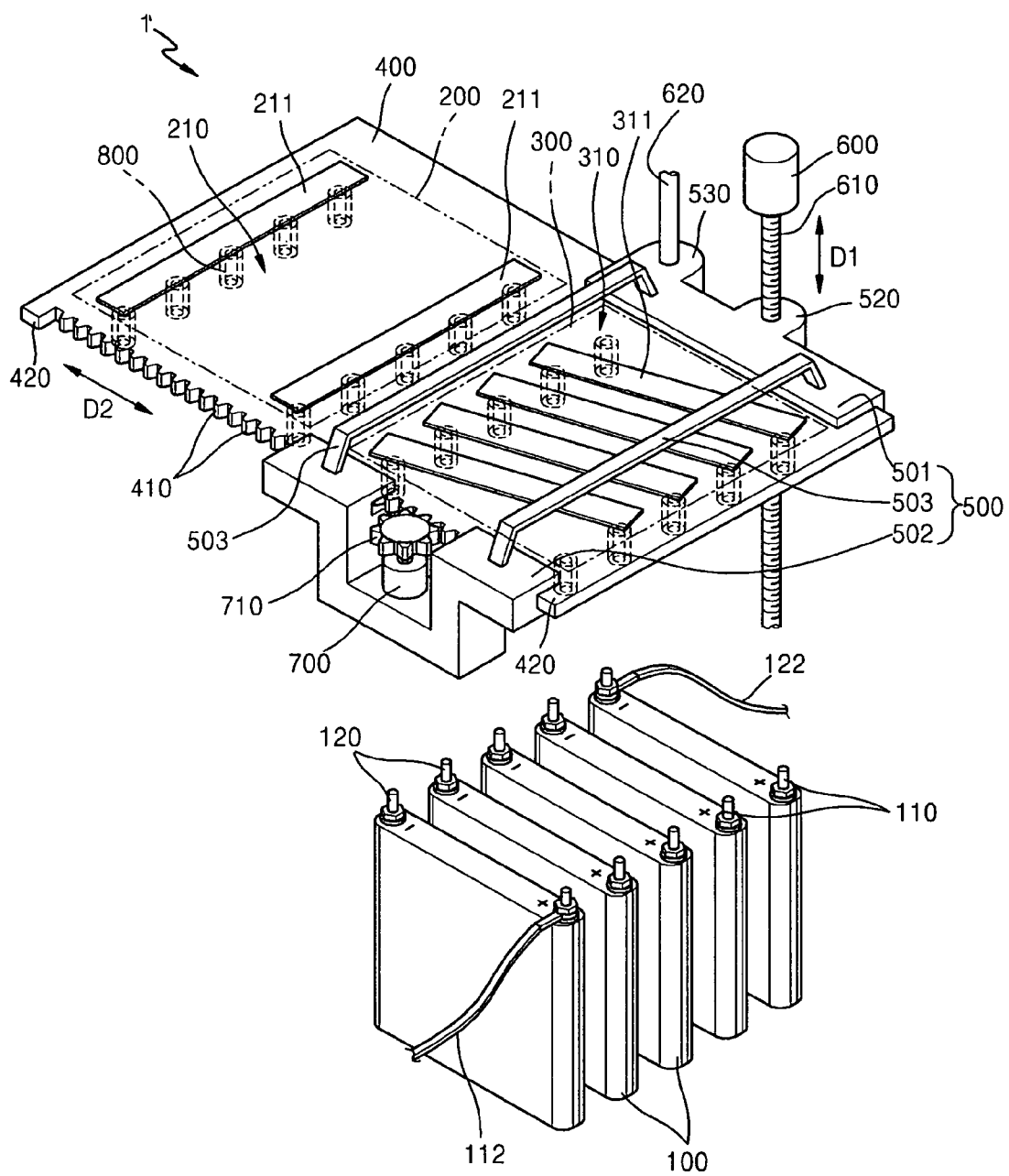
FIG. 1 illustrates a perspective view of a battery pack according to an embodiment.

Korean Patent Application No. 10-2009-0129130, filed on Dec. 22, 2009, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

First, a battery pack according to an embodiment will be described.

Figure 2:
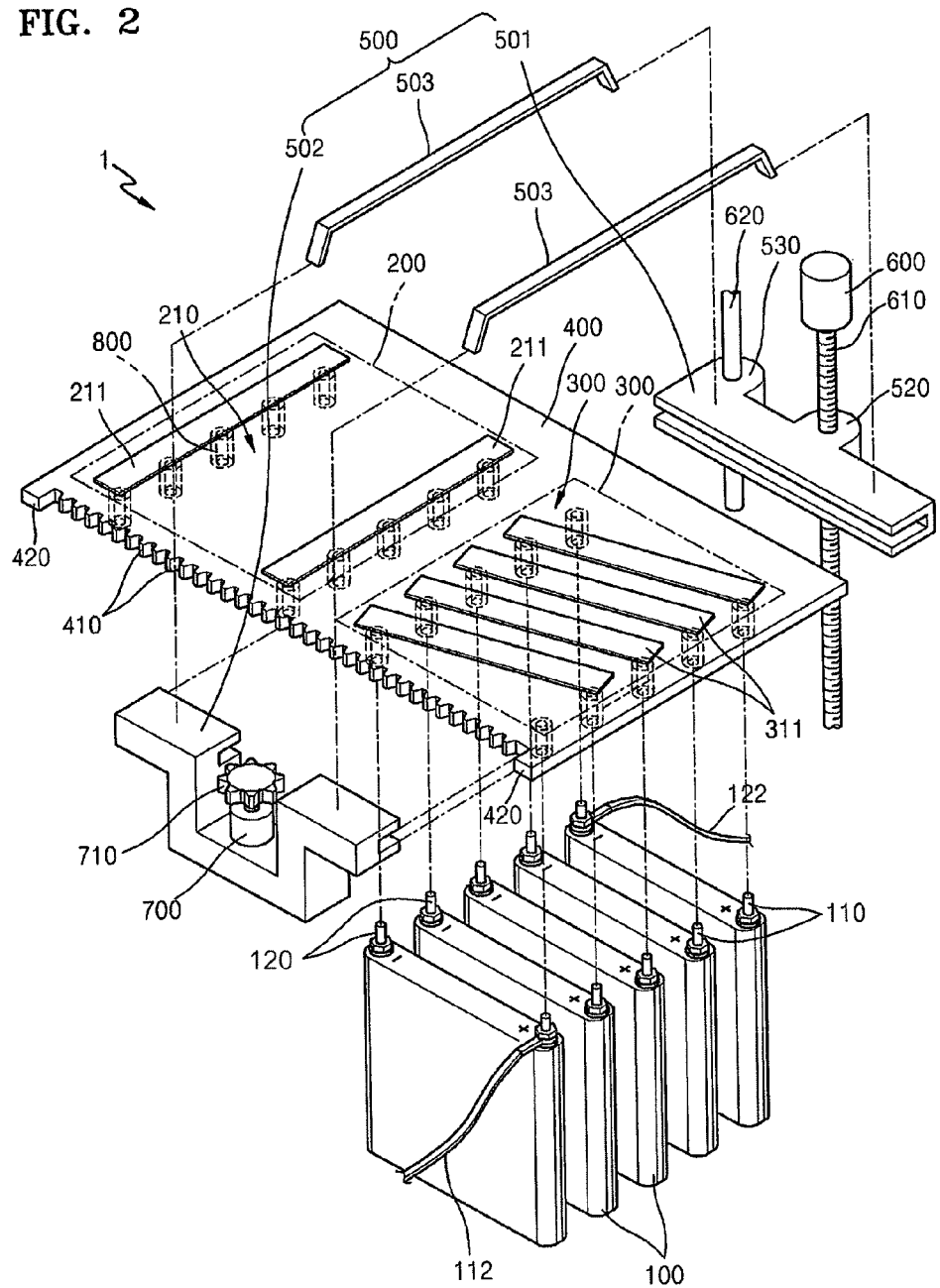
FIG. 2 illustrates an exploded perspective view of the battery pack of FIG. 1.
Figure 3:
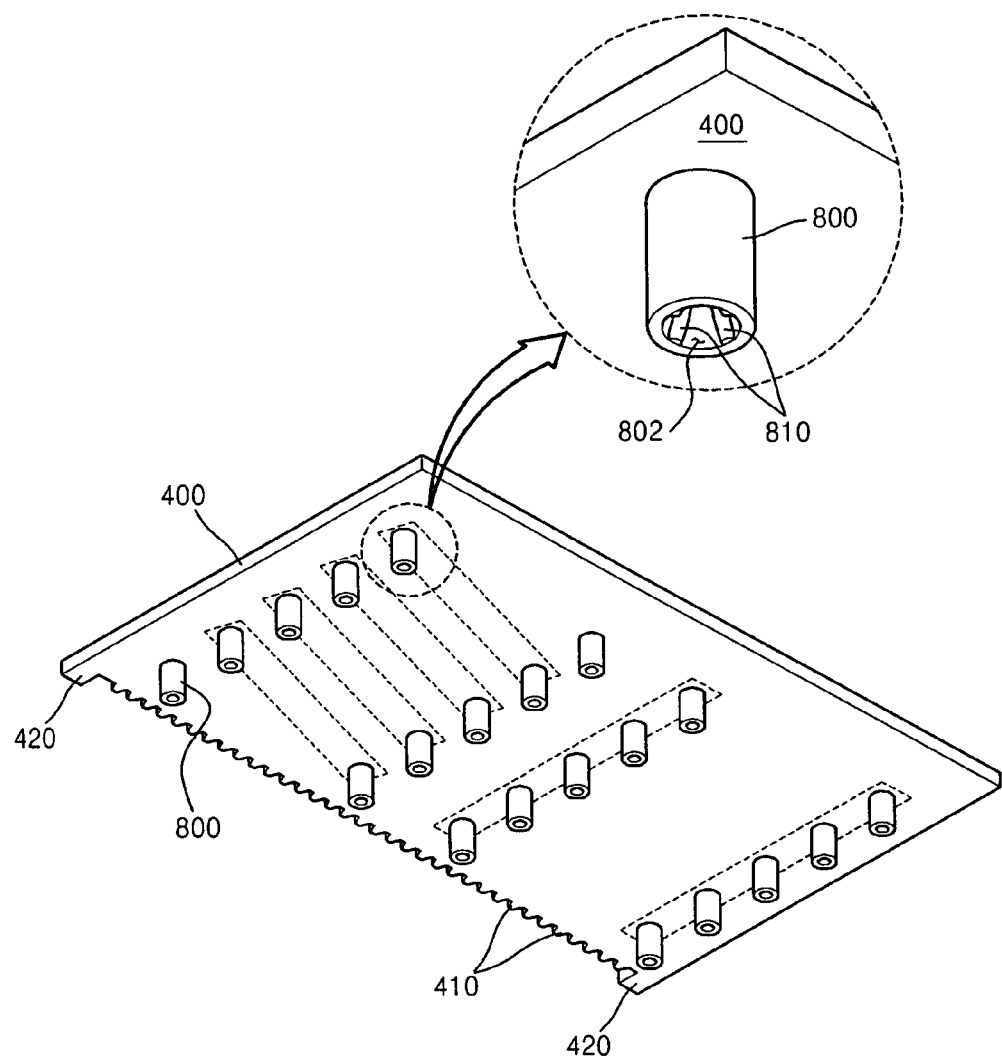
FIG. 3 illustrates a bottom view of a substrate of the battery pack of FIG. 1.
Figure 4:
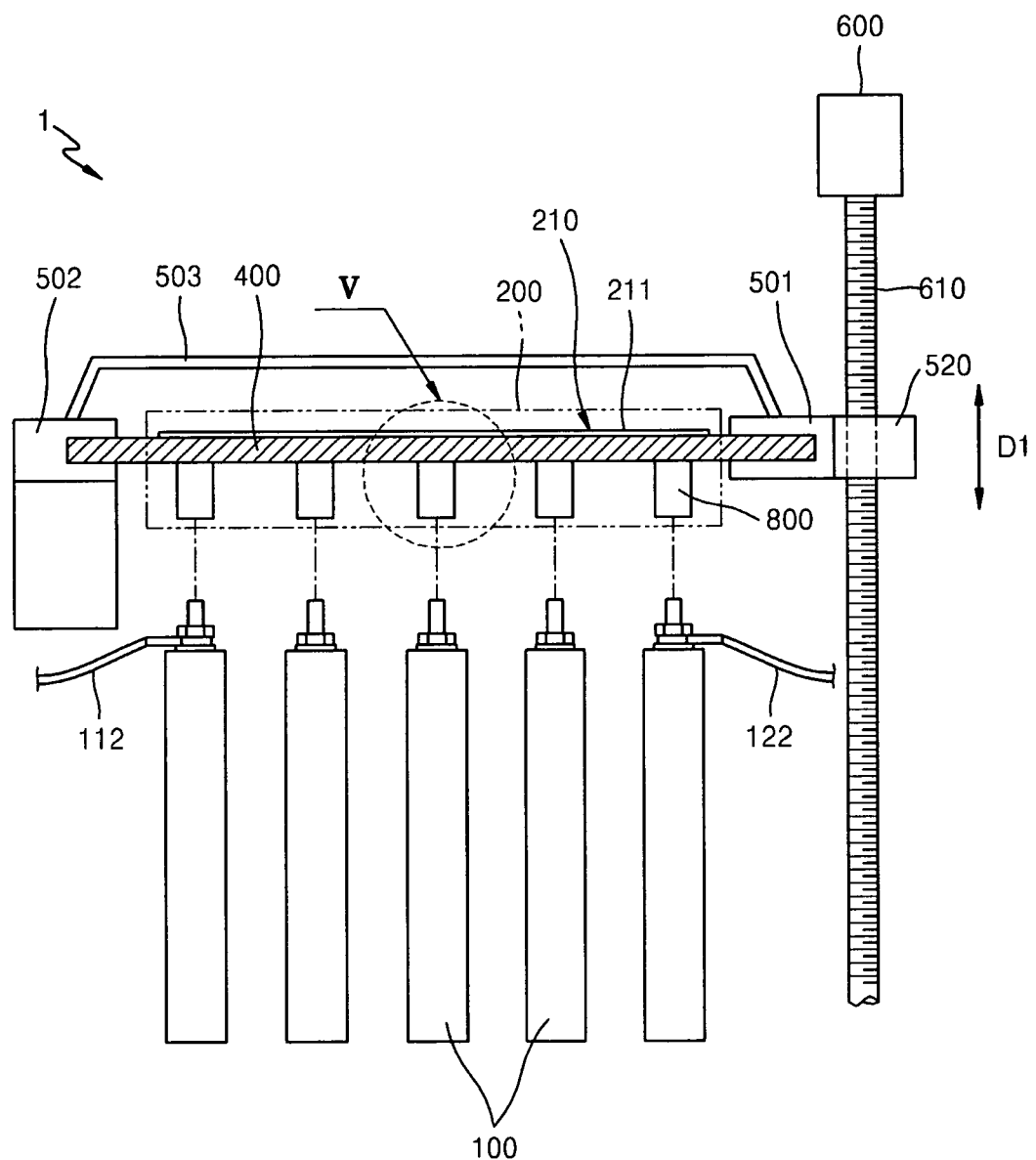
FIG. 4 illustrates a side view of the battery pack of FIG. 1.
Figure 5:
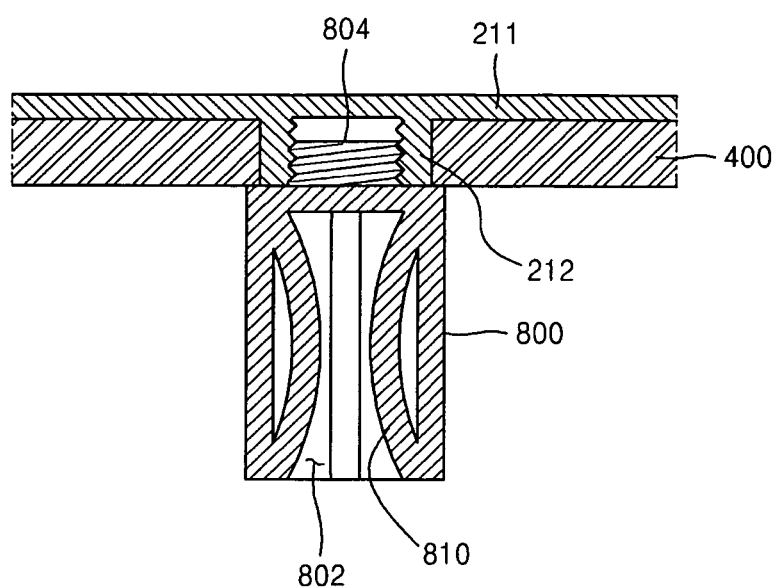
FIG. 5 illustrates a cross-sectional view of a portion V of FIG. 4.
Figure 6A:
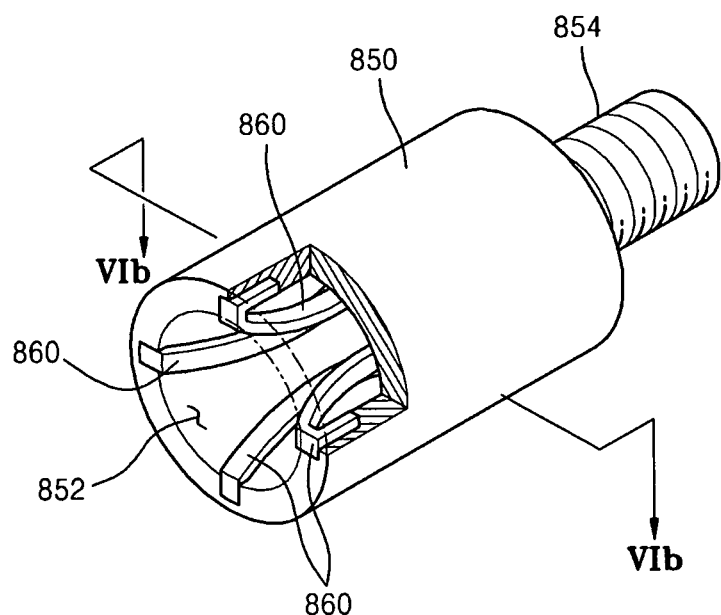
FIG. 6A illustrates a perspective view of a socket in the battery pack of FIG. 1.
Figure 6B:
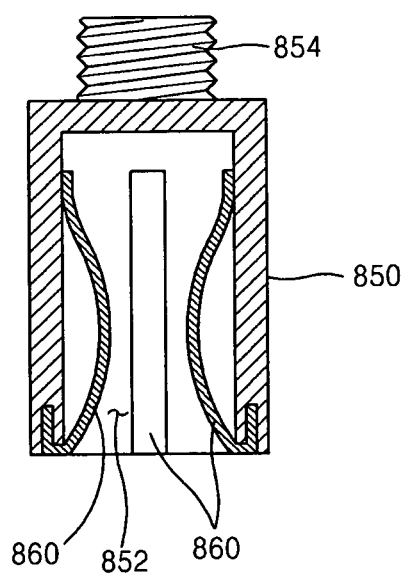
FIG. 6B illustrates a cross-sectional view of the socket of FIG. 6A taken along a line VIb-VIb.
Figure 7:
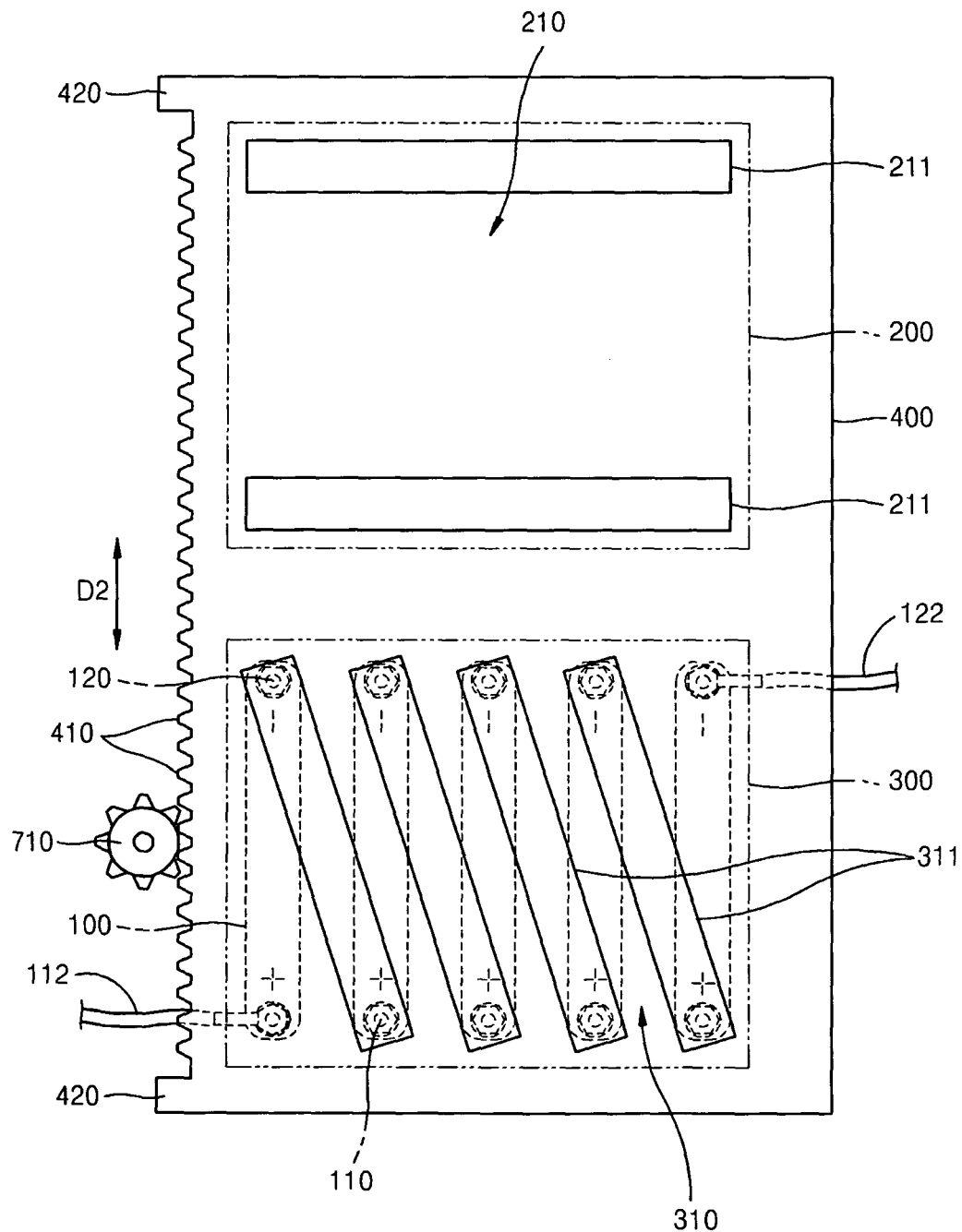
FIG. 7 illustrates a plan view of an operational state of the battery pack of FIG. 1.
Figure 8:
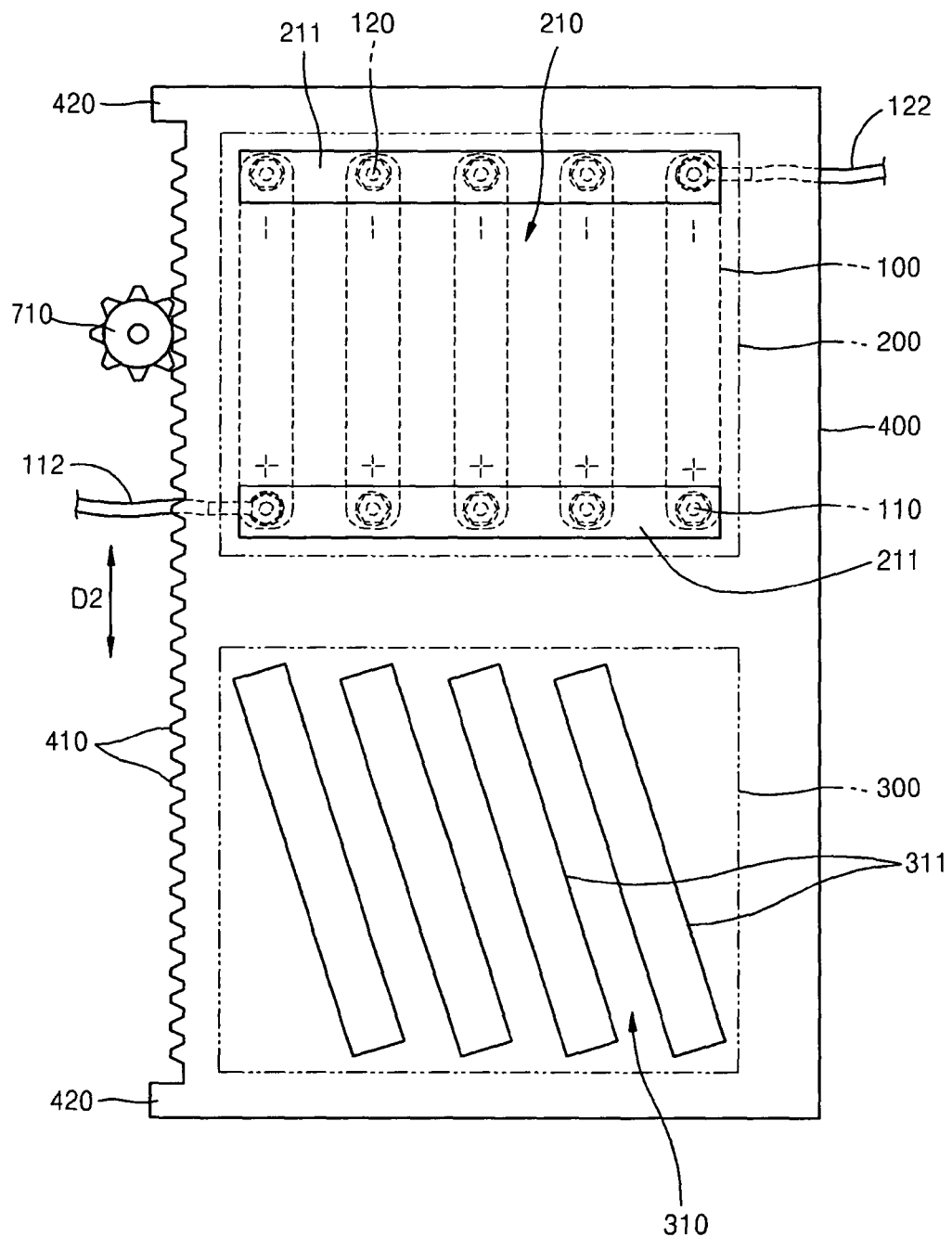
FIG. 8 illustrates a plan view of another operational state of the battery pack of FIG. 1.

FIG. 1 illustrates a perspective view of a battery pack 1 according to the present embodiment. FIG. 2 illustrates an exploded perspective view of the battery pack 1 of FIG. 1. FIG. 3 illustrates a bottom view of a substrate of the battery pack 1 of FIG. 1. FIG. 4 illustrates a side view of the battery pack 1 of FIG. 1. FIG. 5 illustrates a cross-sectional view of a portion V of FIG. 4. FIG. 6A illustrates a perspective view of a socket in the battery pack 1 of FIG. 1. FIG. 6B illustrates a cross-sectional view of the socket of FIG. 6A taken along a line VIb-VIb. FIG. 7 illustrates a plan view of an operational status of the battery pack 1 of FIG. 1. FIG. 8 illustrates a plan view of another operational status of the battery pack 1 of FIG. 1.

Referring to FIGS. 1 through 8, the battery pack 1 according to the present embodiment may include a plurality of battery cells 100, an integrated substrate or substrate unit 400, and a transport medium.

The battery cells 100 may be disposed in a single direction to be parallel with each other, i.e., in a battery cell array. The battery cell 100 may include a positive electrode terminal 110 and a negative electrode terminal 120 that protrude from an upper portion of each battery cell 100. In the present embodiment, the positive electrode terminals 110 of the battery cells 100 may be disposed in a single direction; and the negative electrode terminals 120 of the battery cells 100 may be disposed in a direction parallel to the single direction of the positive electrode terminals 110. A positive electrode lead line 112 may be coupled to the positive electrode terminal 110 of the battery cell 100 at an end of the array of the battery cells 100. A negative electrode lead line 122 may be coupled to the negative electrode terminal 120 of the battery cell 100 at an opposite end of the array. The positive electrode lead line 112 and the negative electrode lead line 122 may be connected to a load, e.g., a driving motor of an electric vehicle, to supply power to the load.

The integrated substrate 400 may include a first substrate 200, a second substrate 300, and a plurality of sockets 800. In an implementation, the first substrate 200 and the second substrate 300 may be, e.g., separate units, fixedly coupled to each other. In an alternative implementation, the first substrate 200 and the second substrate 300 may be formed as one body.

The first substrate 200 may include a first circuit 210 for electrically connecting the positive electrode terminals 110 and the negative electrode terminals 120 of the battery cells 100 so that the battery cells 100 are electrically connected to each other. The first circuit 210 may include a first conductive plate 211 for electrically connecting the positive electrode terminals 110 and a second conductive plate 211 for electrically connecting the negative electrode terminals 120 so that the first circuit 210 may connect the battery cells 100 in parallel. The conductive plates 211 forming the first circuit 210 may include bosses 212 that protrude from the integrated substrate 400 and extend downward. The bosses 212 may penetrate the integrated substrate 400 and may contact a bottom surface of the integrated substrate 400. A screw groove may be formed in an inner circumference of each boss 212.

The second substrate 300 may include a second circuit 310 for electrically connecting the battery cells 100 in a manner different from the manner in which the first circuit 210 of the first substrate 200 connects the battery cells 100. For example, unlike the first circuit 210, the second circuit 310 may connect the battery cells 100 in series and may include a conductive plate 311 for electrically connecting the positive electrode terminal 110 of each battery cell 100 with the negative electrode terminal 120 of an adjacent battery cell 100. Similar to the conductive plates 211 of the first substrate 200, the conductive plates 311 may include bosses 212 penetrating the integrated substrate 400. In an implementation, the first substrate 200 and the second substrate 300 may have a saw tooth or toothed portion 410 disposed at adjacent side ends thereof in a longitudinal direction. In other words, the integrated substrate 400 may have the toothed portion 410 at a side end thereof along the longitudinal direction. In an implementation, the toothed portion 410 may be a rack gear.

As illustrated in FIG. 3, the sockets 800 may be coupled to bottom surfaces of the first substrate 200 and the second substrate 300. The sockets 800 may be arranged at positions respectively corresponding to the positive electrode terminals 110 and the negative electrode terminals 120 of the battery cells 100 so that the positive electrode terminals 110 and the negative electrode terminals 120 of the battery cells 100 may be inserted into the sockets 800. Thus, since the first substrate 200 and the second substrate 300 may include the sockets 800 corresponding to the positive electrode terminals 110 and the negative electrode terminals 120 of the battery cells 100, the first substrate 200 and the second substrate 300 may be interchangeably connected to the positive electrode terminals 110 and the negative electrode terminals 120.

As illustrated in FIG. 5, each socket 800 may include a screw unit 804. Each screw unit 804 may be engaged with each boss 212 of the conductive plates 211 and 311 so that the sockets 800 and the conductive plates 211 and 311 may be mechanically and electrically coupled.

The sockets 800 may include reception grooves 802. The positive electrode terminals 110 and the negative electrode terminals 120 of the battery cells 100 may be inserted into the reception grooves 802 and thus combined with the reception grooves 802. A plurality of fixed protrusions 810 may be formed in an inner circumference of each reception groove 802. Each fixed protrusion 810 may extend along a longitudinal direction of each socket 800 and may have side end portions that protrude less than a center portion of each fixed protrusion 810. In other words, portions of the fixed protrusions 810 that are adjacent to openings of the sockets 800 may protrude less than center portions of the fixed protrusions 810. In an implementation, a distance that the side portions protrude may be less than a distance the central portions protrude. Since the portions of the fixed protrusions 810 that are adjacent to the openings of the sockets 800 may protrude relatively less than the center portions thereof, an interval between the portions of the fixed protrusions 810 that are adjacent to the openings of the sockets 800 may be larger than an interval between the center portions of the fixed protrusion 810. Thus, when the positive electrode terminals 110 and the negative electrode terminals 120 of the battery pack 1 are inserted into the reception grooves 802 of the sockets 800, the positive electrode terminals 110 and the negative electrode terminals 120 may be guided by the fixed protrusions 810. When the positive electrode terminals 110 and the negative electrode terminals 120 of the battery pack 1 are inserted into the reception grooves 802 a predetermined amount, the positive electrode terminals 110 and the negative electrode terminals 120 of the battery pack 1 may be fixed between the fixed protrusions 810.

Each socket 800 may be formed of, e.g., copper, a copper-nickel alloy, or a copper chrome alloy, so as to have excellent electrical conductivity and durability.

The sockets 800 may take on any suitable form. FIGS. 6A and 6B illustrate a socket 850 having a form different from that of the sockets 800. Similar to the sockets 800, the socket 850 illustrated in FIGS. 6A and 6B may also include a screw portion 854 and may be engaged with the conductive plates 211 and 311. The socket 850 may have a reception groove 852 in which a plurality of elastic pieces 860 may be arranged. Each elastic piece 860 may have elasticity and may be formed of a metallic material so that electricity may flow through the elastic piece 860. Since each elastic piece 860 may have elasticity, when the positive electrode terminal 110 or the negative electrode terminal 120 of one battery cell 100 is inserted into the reception groove 852 of the socket 850, the elastic pieces 860 may be elastically pressed by the positive electrode terminal 110 or the negative electrode terminal 120. Thus, contact between the socket 850 and the positive electrode terminal 110 or the negative electrode terminal 120 may be effectively maintained.

The transport medium may facilitate selective attachment and detachment of the first substrate 200 and the second substrate 300 to and from the battery cells 100. The transport medium may couple one of the first substrate 200 and the second substrate 300 with the positive electrode terminals 110 and the negative electrode terminals 120 of the battery cells 100.

The battery pack 1 according to the present embodiment may include a substrate holder 500, a first driving source 600, and a second driving source 700.

The substrate holder 500 may include a first holder member 501, a second holder member 502, and connecting members 503.

The first holder member 501 may have a groove extending along a horizontal direction thereof. A side end of the integrated substrate 400 may be inserted into the groove. A ball bearing portion 520 may be disposed in the first holder member 501. A vertical movement guide 530 may be disposed on a side portion of the first holder member 501 so as to hold a vertical bar 620. The vertical bar 620 may enable fixed relative motion with respect to the battery cells 100. Thus, movement of the first holder member 501 may occur only in an upward or downward direction by the vertical movement guide 530.

The second holder member 502 and the first holder member 501 may be disposed on opposite sides of the integrated substrate 400. The second holder member 502 may also have a groove in the horizontal direction. The toothed portion 410 disposed at a side end of the integrated substrate 400 may be inserted into the groove of the second holder member 502. The groove of the second holder member 502 may have a depth insufficient to receive a stopper 420 of the integrated substrate 400 so that the stopper 420 may not be inserted into the groove of the second holder member 502. In other words, the stopper 420 may be disposed at ends of the toothed portion 410 to limit a range of movement of the integrated substrate 400.

Each connecting member 503 may have one end fixedly coupled to the first holder member 501 and may have another end fixedly coupled to the second holder member 502. Thus, the first holder member 501 and the second holder member 502 may be fixedly coupled with respect to each other via the connecting members 503.

The integrated substrate 400 between the first holder member 501 and the second holder member 502 may facilitate relative movement with respect to the substrate holder 500 in a horizontal direction D2. Bearings (not illustrated) may be disposed in the grooves of the first holder member 501 and the second holder member 502 so that movement of the integrated substrate 400 may be smoothly performed.

The first driving source 600 may be a motor for rotating a screw 610 that is inserted into and coupled to the ball bearing portion 520 of the first holder member 501. The first driving source 600 may facilitate fixed relative movement with respect to the battery cells 100. The screw 610 may be connected to a driving axis of the first driving source 600 so that the screw 610 may be rotated when the first driving source 600 is operated. The screw 610 may be arranged in parallel with a protrusion direction of the positive electrode terminals 110 and the negative electrode terminals 120 of the battery cells 100 so that the substrate holder 500 may move in a vertical direction D1. In this manner, the first driving source 600 may rotate the screw 610. Thus, the first driving source 600 may move the first substrate 200 and the second substrate 300 so as to allow the first substrate 200 and the second substrate 300 to be attached to or to be detached from the battery cells 100.

The second driving source 700 may be fixedly coupled to the second holder member 502. The second driving source 700 may be a motor for rotating a rotational gear 710 that may be gear-engaged with the toothed portion 410 on the integrated substrate 400. In the present embodiment, since the toothed portion 410 of the integrated substrate 400 may be a rack gear, the rotational gear 710 may be a pinion gear that may be gear-engaged with the toothed portion 410. When the second driving source 700 is operated, the rotational gear 710 may push on the toothed portion 410 of the integrated substrate 400, thereby moving the integrated substrate 400 in the horizontal direction D2. That is, the second driving source 700 may move the integrated substrate 400 including the first substrate 200 and the second substrate 300 in a direction perpendicular to a direction in which the integrated substrate 400 including the first substrate 200 and the second substrate 300, is moved, thereby to be attached to or to be detached from the battery cells 100.

Hereinafter, operations and effects of the battery pack 1 according to the present embodiment will be described.

In order to connect the battery cells 100 in series, the second substrate 300 of the integrated substrate 400 may be coupled with the battery cells 100. Thus, as illustrated in FIG. 1, the second substrate 300 may be arranged above the battery cells 100; and then the first driving source 600 may be operated. The first driving source 600 may be operated and the screw 610 may be rotated in such as a way as to move the substrate holder 500 downward so that the substrate holder 500 may approach the positive electrode terminals 110 and the negative electrode terminals 120 of the battery cells 100. When the substrate holder 500 moves downward, the second substrate 300 may approach the positive electrode terminals 110 and the negative electrode terminals 120 of the battery cells 100. As the substrate holder 500 is moved downward, the positive electrode terminals 110 and the negative electrode terminals 120 of the battery pack 1 may enter into the reception grooves 802 of corresponding sockets 800 of the second substrate 300. When the second substrate 300 further moves downward, the positive electrode terminals 110 and the negative electrode terminals 120 may be inserted into and then fixed between the fixed protrusions 810 of the corresponding sockets 800. When the sockets 800 are coupled to the positive electrode terminals 110 and the negative electrode terminals 120, the conductive plate 311 forming the second circuit 310 of the second substrate 300 may connect the positive electrode terminal 110 of each battery cell 100 with the negative electrode terminal 120 of an adjacent battery cell 100. Thus, as illustrated in FIG. 7, the battery cells 100 may be connected in series.

When the battery cells 100 of the battery pack 1 are connected in series, an electrical potential difference between the positive electrode lead line 112 and the negative electrode lead line 122 may increase in proportion to the number of battery cells 100, compared to an electrical potential difference between the positive electrode terminal 110 and the negative electrode terminal 120. Thus, the serial connection may be used for a high output load demanding a high input voltage.

In order achieve a lower output voltage but longer operating time of the battery pack 1, the battery cells 100 may be connected in parallel. In this case, the first driving source 600 may be rotated in an inverse direction so that the substrate holder 500 moves upward. As the substrate holder 500 moves upward, the second substrate 300 may be detached from the battery cells 100. When the second substrate 300 is detached from the battery cells 100, the second driving source 700 may be operated. When the second driving source 700 is operated, the rotational gear 710, e.g., pinion gear, may be rotated so that the rotational gear 710 pushes on the toothed portion 410 of the integrated substrate 400, which may be engaged with the rotational gear 710, thereby moving the integrated substrate 400. Thus, the integrated substrate 400 may be moved in the horizontal direction D2 in such a way that the first substrate 200 is positioned between the first holder member 501 and the second holder member 502, i.e., the first substrate 200 may be positioned above the battery cells 100. While the first substrate 200 is positioned above the battery cells 100, the first driving source 600 may be operated again. When the first driving source 600 is operated, the substrate holder 500 may move downward again so that the positive electrode terminals 110 and the negative electrode terminals 120 of the battery cells 100 are inserted into and then coupled to corresponding sockets 800 of the first substrate 200. When the first substrate 200 is coupled to the positive electrode terminals 110 and the negative electrode terminals 120, the positive electrode terminals 110 may be connected to each other; and the negative electrode terminals 120 may be connected to each other due to the conductive plates 211 forming the first circuit 210 of the first substrate 200. Thus, as illustrated in FIG. 8, the battery cells 100 may be connected in parallel.

When the battery cells 100 are connected in parallel, the electrical potential difference between the positive electrode lead line 112 and the negative electrode lead line 122 may be equal to the electrical potential difference between the positive electrode terminal 110 and the negative electrode terminal 120 of each battery cell 100. Thus, the parallel connection may be used for a load demanding a low input voltage. Meanwhile, since the battery cells 100 are connected in parallel, the use time of the battery pack 1 may increase in proportion to the number of battery cells 100, as compared to a use time of the battery pack 1 when the battery cells 100 are connected in series.

By using the battery pack 1 according to the present embodiment, the output voltage of the battery pack 1 may be changed according to a selection of a user. Also, unlike a direct current-to-direct current (DC-DC) converter, the battery pack 1 according to the present embodiment may be used in a case in which high current flow, and a power loss due to a change of a voltage does not occur.

When the battery pack 1 according to the present embodiment is used in an electric vehicle or the like, horsepower of the electric vehicle may be changed. For example, when the electric vehicle includes both a high voltage-high output motor and a low voltage-low output motor, when the high voltage-high output motor is used, the battery cells 100 may be connected in series; and when the low voltage-low output motor is used, the battery cells 100 may be connected in parallel. When the high voltage-high output motor is used, the horsepower of the electric vehicle may increase while a use time of the battery pack 1 may decrease. When the low voltage-low output motor is used, the horsepower of the electric vehicle may decrease while the use time of the battery pack 1 may increase.

Hereinafter, a battery pack 2 according to another embodiment will be described.

Figure 9:
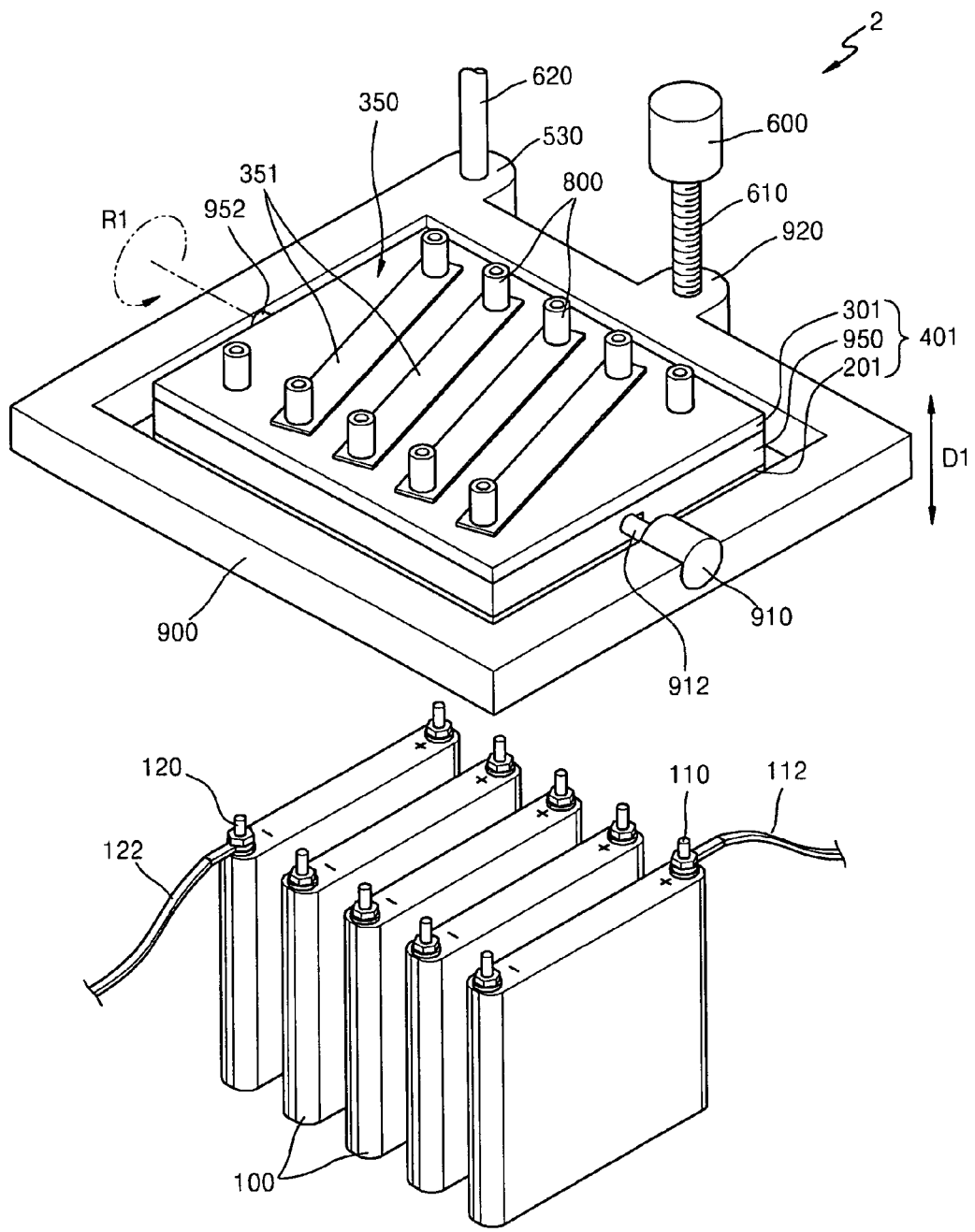
FIG. 9 illustrates a perspective view of a battery pack according to another embodiment.
Figure 10:
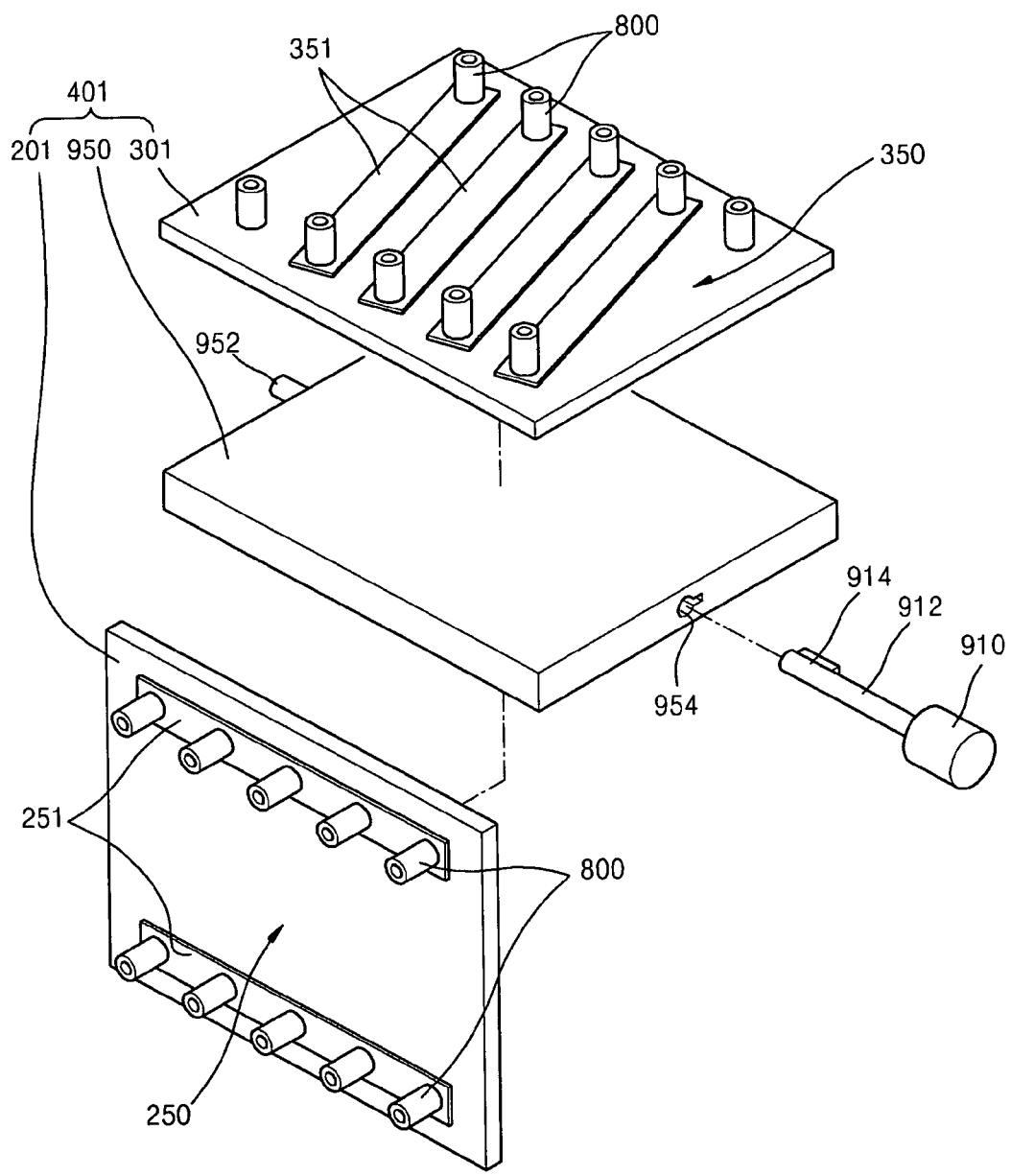
FIG. 10 illustrates an exploded perspective view showing a state of assembly of first and second substrates of the battery pack of FIG. 9.
Figure 11:
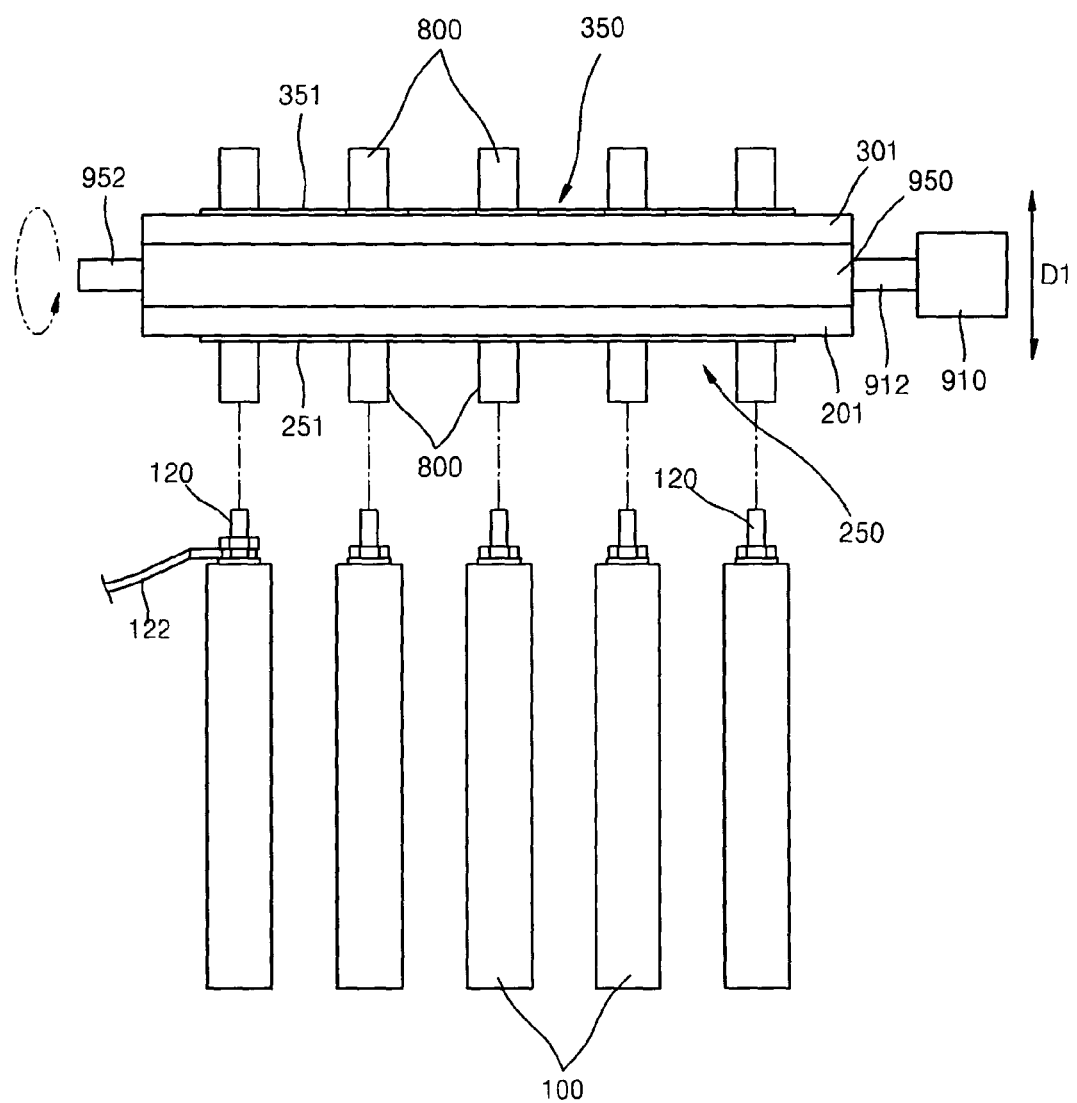
FIG. 11 illustrates a side view of the battery pack of FIG. 9.

FIG. 9 illustrates a perspective view of the battery pack 2 according to another embodiment. FIG. 10 illustrates an exploded perspective view showing a state of assembly of first and second substrates of the battery pack 2 of FIG. 9. FIG. 11 illustrates a side view of the battery pack 2 of FIG. 9.

Referring to FIGS. 9 through 11, the battery pack 2 according to the present embodiment may include a plurality of battery cells 100, a double-sided substrate 401, a substrate holder 900, and a transport medium.

The battery cells 100 according to the present embodiment may be the same as the battery cells 100 according to the previous embodiment.

The double-sided substrate 401 may include a first substrate 201, a second substrate 301, and an insulator 950.

The first substrate 201 may include a first circuit 250 including two conductive plates 251 and protruding sockets 800 connected to the conductive plates 251. The sockets 800 may be connected to a surface on which the conductive plates 251 are arranged. The conductive plates 251 of the first circuit 250 may connect each of the positive electrode terminals 110 to each other and may connect each of the negative electrode terminals 120 to each other, so as to connect the battery cells 100 in parallel.

The second substrate 301 may be disposed above the first substrate 201 in such a manner that a surface of the second substrate 301 that contacts the battery cells 100 and a surface of the first substrate 201 that contacts the battery cells 100 are facing in opposite directions. That is, the surfaces of the first and second substrates 201 and 301 that contact the battery cells 100 may face in opposite directions. The second substrate 301 may include a second circuit 350 including a plurality of conductive plates 351 and protruding sockets 800 connected to the conductive plates 351. The sockets 800 may be connected to the surface on which the conductive plates 351 are arranged so that the sockets 800 of the first substrate 201 face in a direction opposite to the direction in which the sockets 800 of the second substrate 301 face. Each conductive plate 351 of the second circuit 301 may connect the positive electrode terminal 110 of each battery cell 100 with the negative electrode terminal 120 of an adjacent battery cell 100, thereby connecting the battery cells 100 in series.

As illustrated in FIG. 10, the insulator 950 may be between the first substrate 201 and the second substrate 301. The insulator 950 may prevent extraneous material from entering between the first substrate 201 and the second substrate 301, which material may facilitate undesirable electrical contact between the first substrate 201 and the second substrate 301. A coupling axis 952 may be disposed on an end of the insulator 950 in a longitudinal direction of the insulator 950; and a coupling groove 954 may be disposed on another end of the insulator 950.

The substrate holder 900 may rotatably support the double-sided substrate 401. The coupling axis 952 of the double-sided substrate 401 may be inserted into the substrate holder 900. A ball bearing portion 920 may be disposed in the substrate holder 900. The substrate holder 900 may include a vertical movement guide 530 into which a vertical bar 620 may be inserted so that the substrate holder 900 may only be moved in a vertical direction D1.

The transport medium may include a first driving source 600 and a second driving source 910.

Similar to the battery pack 1 according to the previous embodiment, the first driving source 600 may be a motor for driving a screw 610. When the first driving source 600 is operated, the first driving source 600 may move the substrate holder 900 in the vertical direction D1. That is, the first substrate 201 and the second substrate 301 may be moved in the vertical direction D1 due to the first driving source 600.

The second driving source 910 may be fixed to the substrate holder 900 and may have a driving axis 912 inserted into the insulator 950 of the double-sided substrate 401. A protrusion 914 may be formed in the driving axis 912 so as to prevent the driving axis 912 from running idly with respect to the double-sided substrate 401, i.e., to engage with the double-sided substrate 401. When the second driving source 910 is operated, the first substrate 201 and the second substrate 301, which may be arranged above and below the insulator 950 and fixed with respect to each other, may rotate in a single direction R1 with respect to the coupling axis 952. That is, the double-sided substrate 401 may turn over so that the first substrate 201 or the second substrate 301 faces the positive electrode terminals 110 and the negative electrode terminals 120 of the battery cells 100.

In order to connect the battery cells 100 in series, the second driving source 910 may be operated until the sockets 800 of the second substrate 301 face the battery cells 100. Then, the first driving source may be is operated until the second substrate 301 is coupled to the battery cells 100. In order to change a serial connection status between the battery cells 100 into a parallel connection, the first driving source 600 may be operated in reverse until the second substrate 301 is detached from the battery cells 100. Then, the second driving source 910 may be operated to turn the double-sided substrate 401 over so that the sockets 800 of the first substrate 201 face the battery cells 100. Then, the first driving source 600 may be operated again until the first substrate 201 and the battery cells 100 are coupled together. In this manner, in the battery pack 2 according to the present embodiment, a connection status between the battery cells 100 may also be easily changed from a serial connection to a parallel connection or from the parallel connection to the serial connection.

Unlike the battery pack 1 according to the previous embodiment, in the battery pack 2 according to the present embodiment, the first and second substrates 201 and 301 may not move in a horizontal direction, so that a space for horizontal movement of the first and second substrates 201 and 301 may not be necessary.

Hereinafter, a battery pack 3 according to yet another embodiment will be described.

Figure 12:
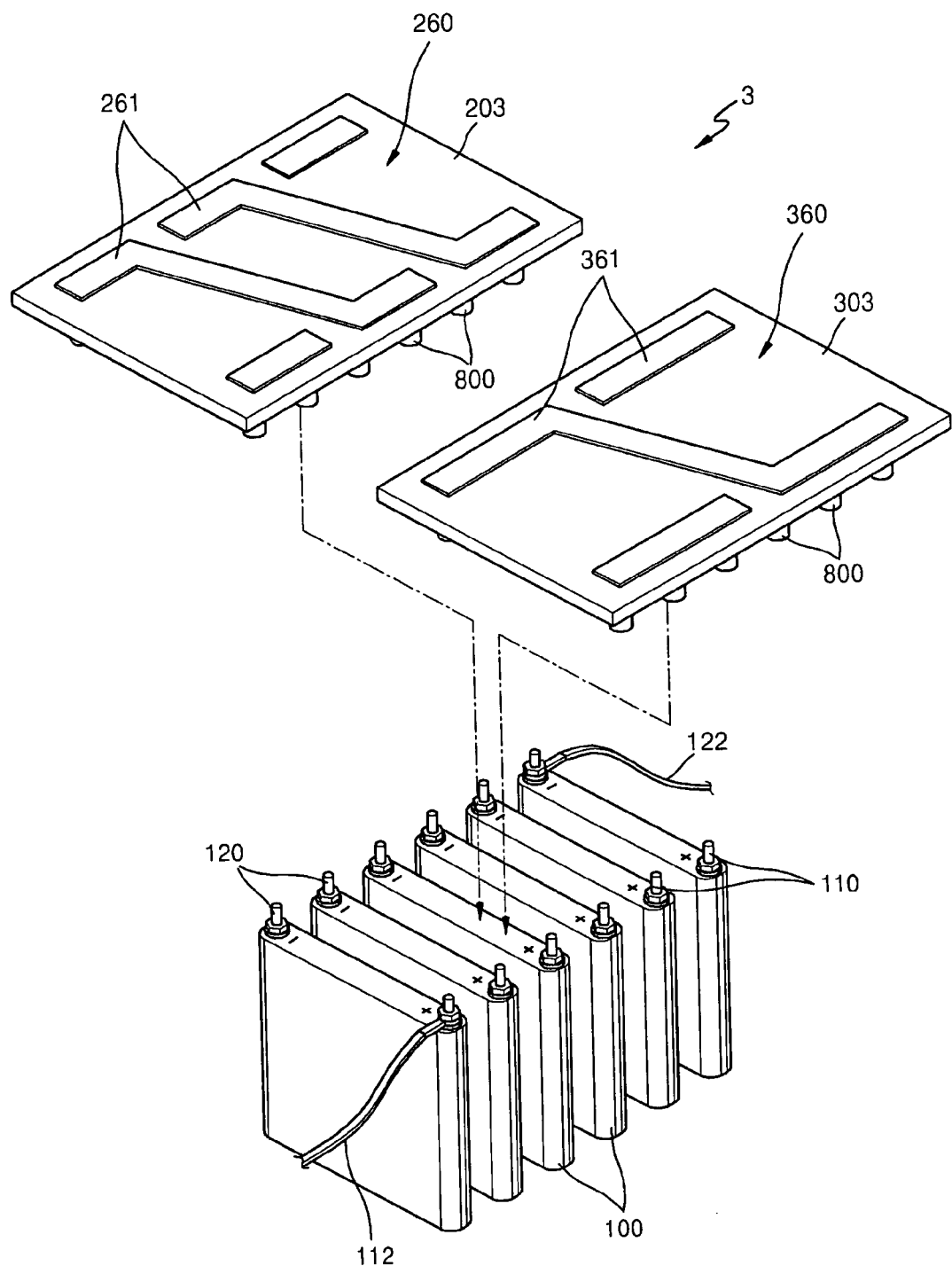
FIG. 12 illustrates a perspective view of a battery pack according to yet another embodiment.
Figure 13:
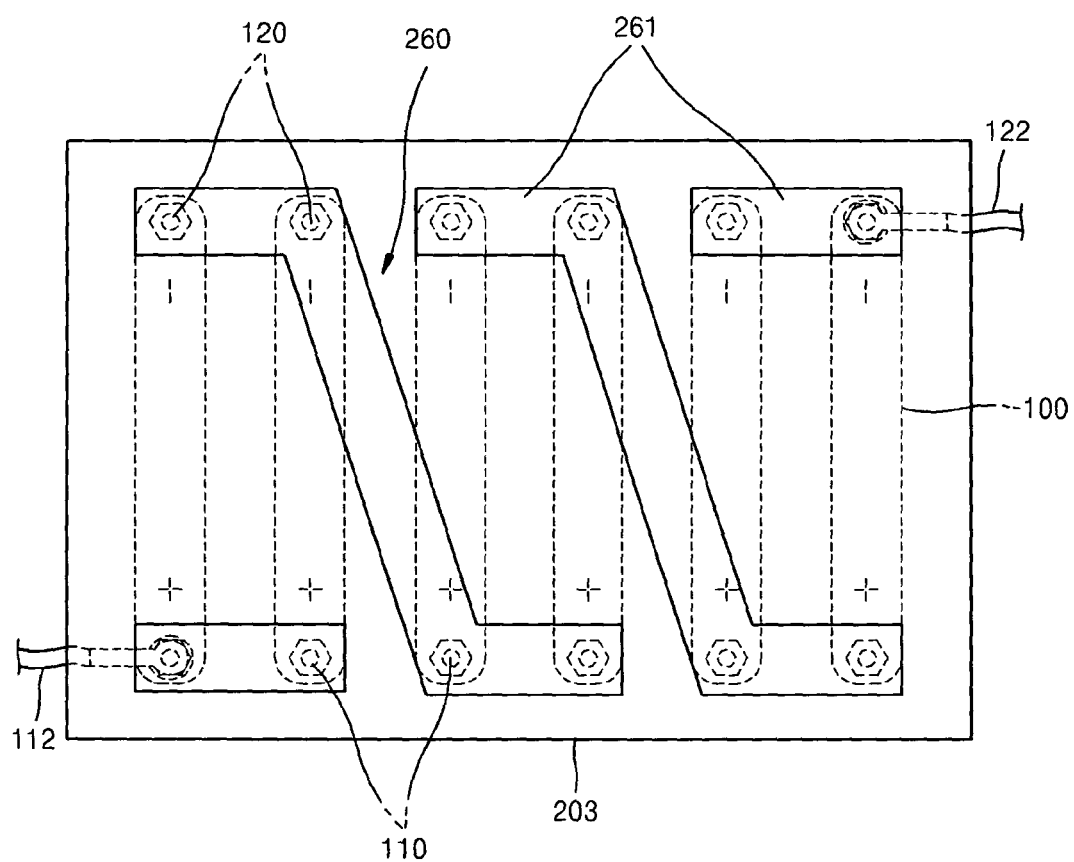
FIG. 13 illustrates a diagram showing a first substrate coupled to battery cells of the battery pack of FIG. 12.
Figure 14:
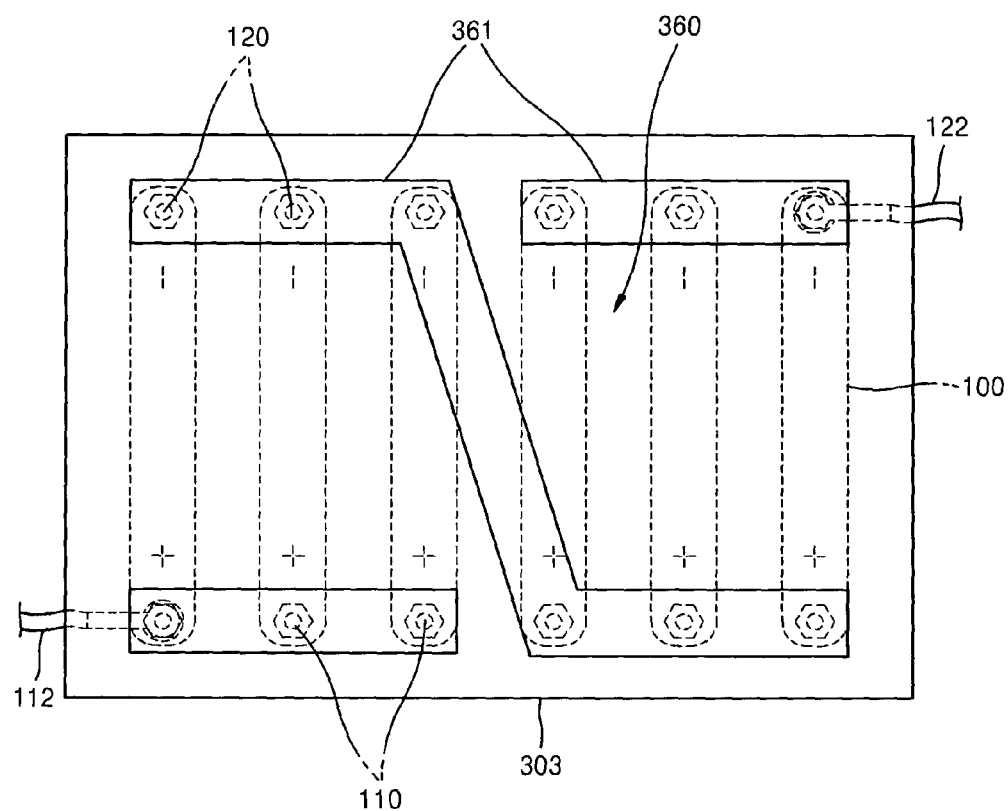
FIG. 14 illustrates a diagram showing a second substrate coupled to the battery cells of the battery pack of FIG. 12.

FIG. 12 illustrates a perspective view of the battery pack 3 according to yet another embodiment. FIG. 13 illustrates a diagram showing a first substrate coupled to battery cells of the battery pack 3 of FIG. 12. FIG. 14 illustrates a diagram showing a second substrate coupled to the battery cells of the battery pack 3 of FIG. 12.

Referring to FIGS. 12 through 14, the battery pack 3 according to the present embodiment may include battery cells 100, a first substrate 203, and a second substrate 303.

The battery cells 100 may be the same as the battery cells 100 of the battery packs 1 and 2 according to the previous embodiments. In an implementation, the battery pack 3 may include, e.g., six battery cells.

The first substrate 203 may include a first circuit 260. The first circuit 260 may connect the positive electrode terminals 110 of some of the battery cells 100 with the negative electrode terminals 120 of corresponding adjacent battery cells 100, thereby connecting some of the battery cells 100 in series and connecting the rest of the battery cells 100 in parallel. The first circuit 260 may include conductive plates 261 for electrically connecting the battery cells 100. Also, sockets 800 electrically coupled to the conductive plates 261 may be disposed on a bottom surface of the first substrate 203. As illustrated in FIG. 13, the first circuit 260 may connect the, e.g., six, battery cells 100 so as to form three pairs and may connect the three pairs in series. That is, an electrical potential difference between a positive electrode lead line 112 and a negative electrode lead line 122 may be three times higher than an electrical potential difference between the positive electrode terminal 110 and the negative electrode terminal 120 of one battery cell 100.

The second substrate 303 and the first substrate 203 may be interchangeably coupled to the battery cells 100. The second substrate 303 may include a second circuit 360 for connecting the positive electrode terminals 110 and the negative electrode terminals 120 of the battery cells 100 in a manner different from the manner in which first circuit 260 is connected to the positive electrode terminals 110 and the negative electrode terminals 120. The second circuit 360 may include conductive plates 361. Also, sockets 800 that are electrically coupled to the conductive plates 361 may be disposed on a bottom surface of the second substrate 303. As illustrated in FIG. 14, the second circuit 360 may connect the six battery cells 100 so as to form two groups each containing three battery cells 100 and may connect the two groups in series. That is, the electrical potential difference between the positive electrode lead line 112 and the negative electrode lead line 122 may be twice as high as the electrical potential difference between the positive electrode terminal 110 and the negative electrode terminal 120 of one battery cell 100.

In this manner, the first substrate 203 and the second substrate 303 may connect the battery cells 100 in a combination manner in which both serial and parallel connections are utilized.

The battery pack 3 according to the present embodiment may not include a separate driving medium so that a manufacturer or a user may couple the first substrate 203 or the second substrate 303 with the battery cells 100 according to the environment in which the battery pack 3 is used. In an alternative implementation, the battery pack 3 may include a transport medium/driving mechanism similar to those of the above-described embodiments.

Meanwhile, according to FIGS. 12 through 14, although the battery pack 3 according to the present embodiment includes the first substrate 203 and the second substrate 303, which have different circuits, the types of possible circuits are not limited thereto. Thus, the battery pack 3 according to the present embodiment may further include a third or fourth substrate having a different circuit from the first and second circuits 260 and 360 of the first and second substrates 203 and 303.

Hereinafter, a battery pack 4 according to still another embodiment will be described.

Figure 15:
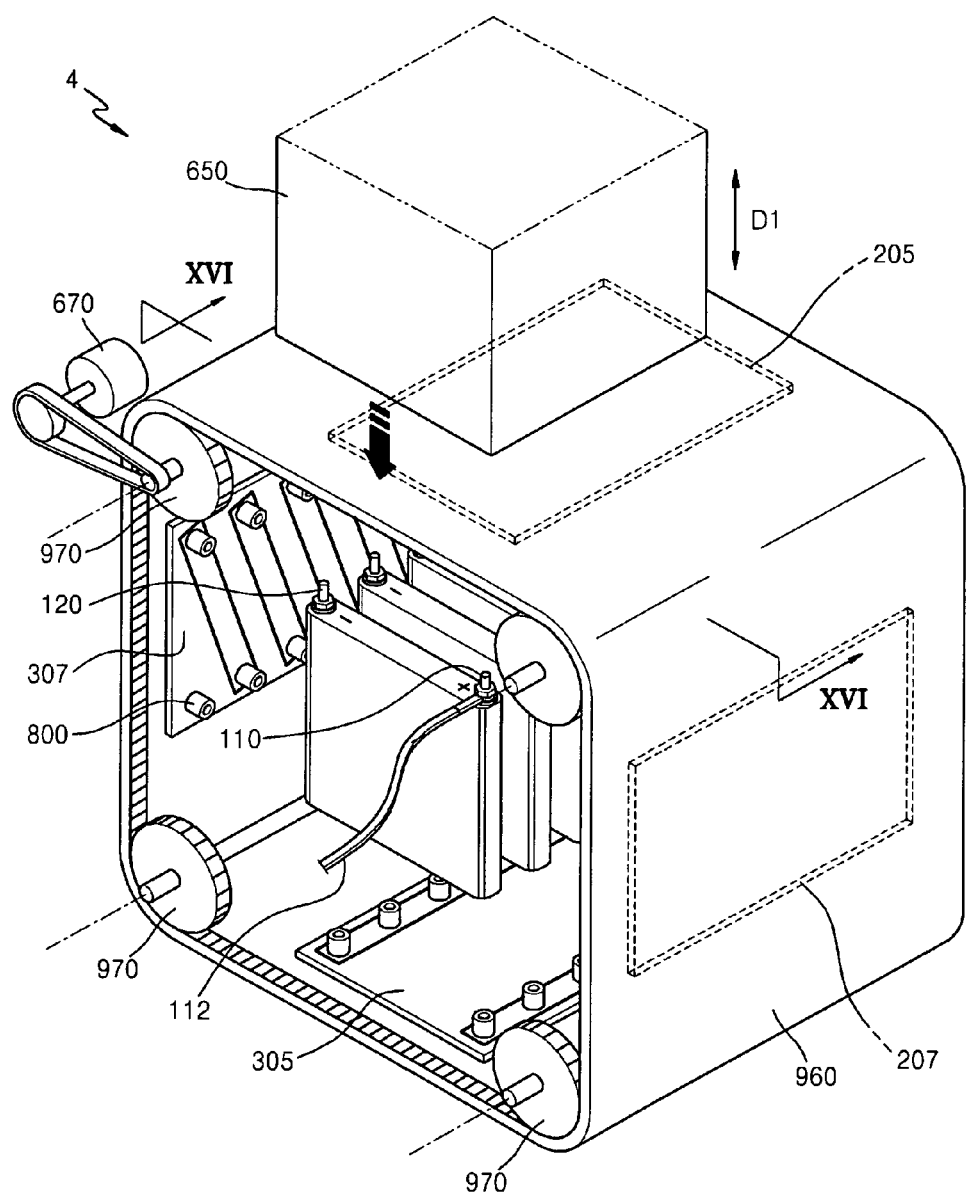
FIG. 15 illustrates a perspective view of a battery pack according to still another embodiment.
Figure 16:
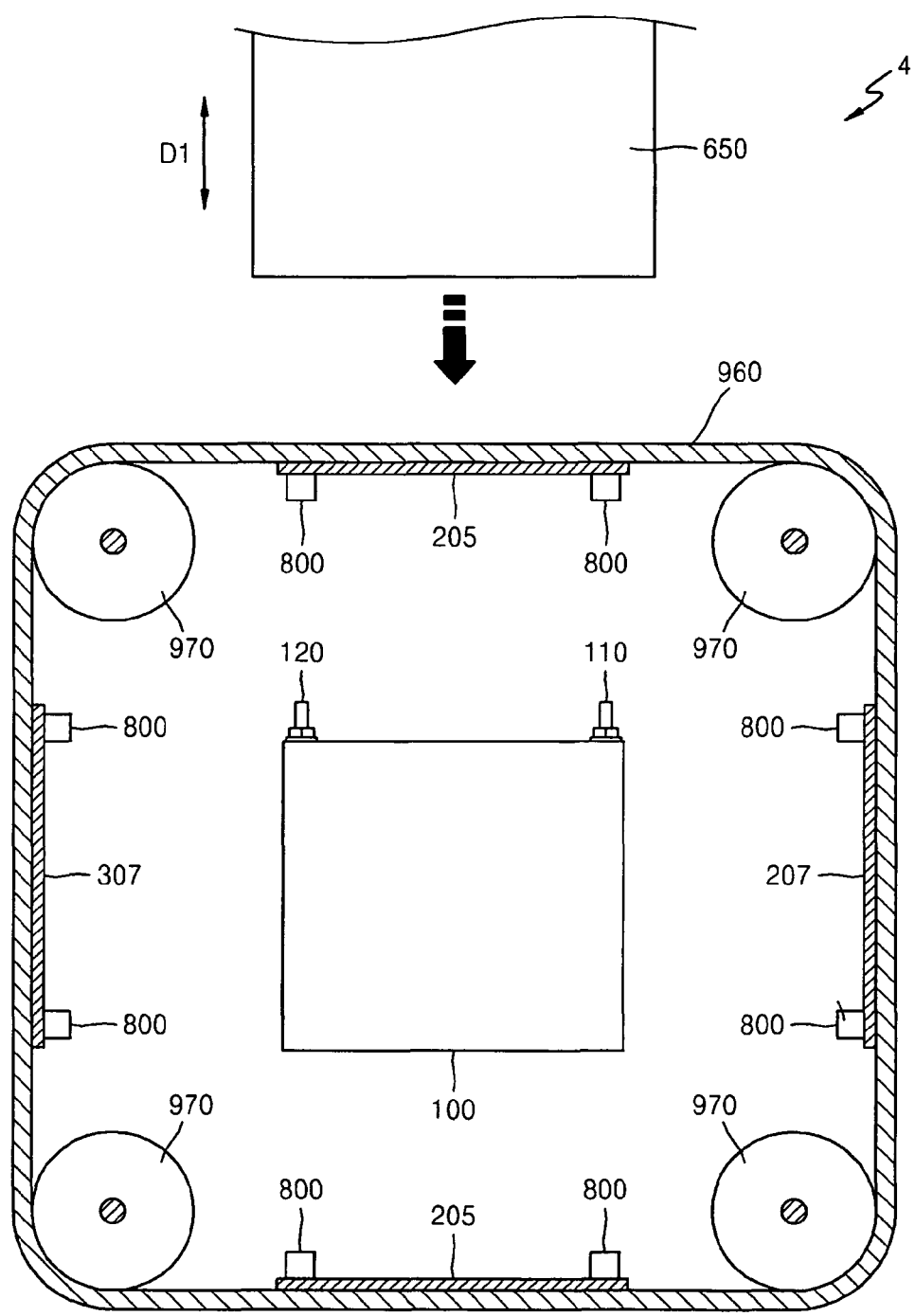
FIG. 16 illustrates a cross-sectional view of the battery pack of FIG. 15 taken along a line XVI-XVI of FIG. 15.
Figure 17:
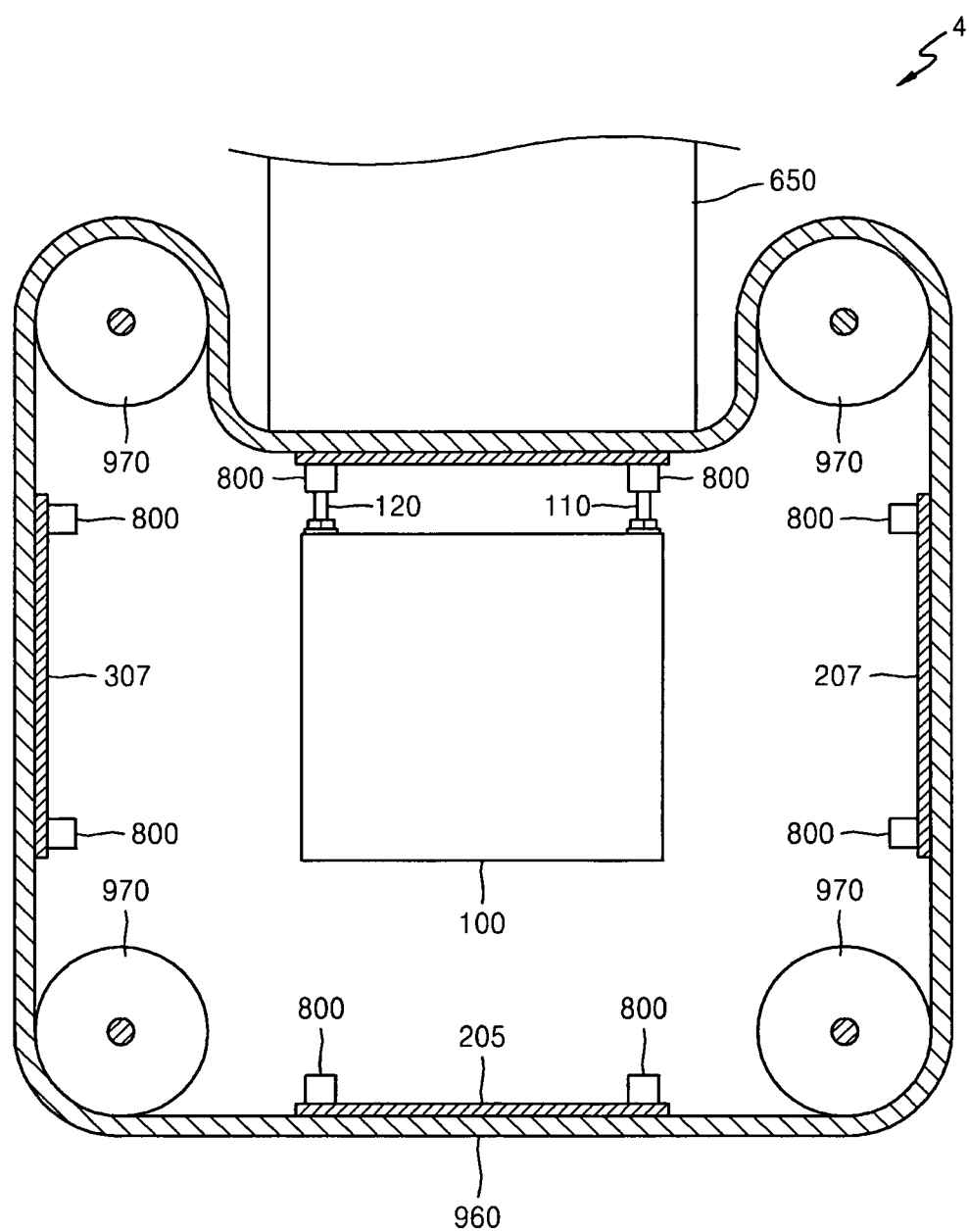
FIG. 17 illustrates a cross-sectional view of a pressurizing body of the battery pack of FIG. 15 applying pressure on a first substrate.

FIG. 15 illustrates a perspective view of the battery pack 4 according to still another embodiment. FIG. 16 illustrates a cross-sectional view of the battery pack 4 of FIG. 15 taken along a line XVI-XVI of FIG. 15. FIG. 17 illustrates a cross-sectional view showing a pressurizing body 650 of the battery pack 4 of FIG. 15 pressurizing a first substrate 205.

Referring to FIGS. 15 through 17, the battery pack 4 according to the present embodiment may include battery cells 100, the first substrate 205, a second substrate 305, a third substrate 207, a fourth substrate 307, and a transport medium.

The battery cells 100 may be the same as the battery cells 100 of the battery packs 1, 2, and 3 according to the previous embodiments. The battery cells 100 may be fixed by a position fixing medium (not shown).

The first through fourth substrates 205, 305, 207, and 307 may be formed of a flexible material and thus may be elastically bent. In an implementation, the first through fourth substrates 205, 305, 207, and 307 may be formed of, e.g., polyimide or a polyester such as polyethylene terephthalate (PET).

The first through fourth substrates 205, 305, 207, and 307 may include sockets 800 for coupling to corresponding positive electrode terminals 100 and negative electrode terminals 120 of the battery cells 100 and may respectively include circuits for electrically connecting the battery cells 100. The circuits disposed on the first through fourth substrates 205, 305, 207, and 307 may be different from each other so as to connect the battery cells 100 in different manners, i.e., in series, in parallel, and/or in combinations thereof.

The transport medium may include a belt 960, a belt driving source 670, and the pressurizing body 650.

The belt 960 may surround the battery cells 100 so that the battery cells 100 may be positioned within the belt 960. The first through fourth substrates 205, 305, 207, and 307 may be attached on inner surfaces of the belt 960, thereby facing the battery cells 100. A plurality of rotating axes 970 may be arranged on the inner surfaces of the belt 960. The belt 960 may be rolled around the rotating axes 970. A diameter at a central part of each rotating axis 970 may be smaller than a diameter at ends of each rotating axis 970 so that the central part of the rotating axis 970 may be separated from the belt 960. Since the central part of each rotating axis 970 may be separated from the belt 960, when the belt 960 rotates, the first through fourth substrates 205, 305, 207, and 307 may pass the rotating axes 970 by passing between the central part of the rotating axis 970 and the belt 960.

The belt driving source 670 may be connected to one of the rotating axes 970, thereby rotating the rotating axis 970 connected to the belt driving source 670. Thus, as the belt driving source 670 is operated, the belt 960 may rotate so that positions of the first through fourth substrates 205, 305, 207, and 307 are changed.

The pressurizing body 650 may be positioned above the belt 960 and may be movable in a vertical direction D1. When the pressurizing body 650 moves downward, the pressurizing body 650 may apply pressure on the belt 960 so as to couple a desired one of the internally attached first through fourth substrates 205, 305, 207, and 307 to the battery cells 100. In order to allow the belt 960 to be easily deformed when the pressurizing body 650 pressurizes the belt 960, the belt 960 may be formed of an elastic material or may be installed in such a manner that each rotating axis 970 may be elastically movable in a vertical direction of itself.

In this manner, by using the transport medium including the belt 960, the belt driving source 670, and the pressurizing body 650, the first through fourth substrates 205, 305, 207, and 307 may be moved to be attached or detached from the battery cells 100.

Hereinafter, operations and effects of the battery pack 4 according to the present embodiment will be described.

When the belt driving source 670 is operated, the belt 960 may rotate until a desired substrate of one of the first through fourth substrates 205, 305, 207, and 307 is positioned above the battery cells 100. When the desired substrate of the one of the first through fourth substrates 205, 305, 207, and 307 is positioned above the battery cells 100, the pressurizing body 650 may move downward to deform the belt 960 so that the desired substrate positioned above the battery cells 100 is coupled to the battery cells 100.

Since the first through fourth substrates 205, 305, 207, and 307 may be formed of a flexible material, the first through fourth substrates 205, 305, 207, and 307 may be bent and moved with the belt 960.

In order to change an output of the battery pack 4, one of the first through fourth substrates 205, 305, 207, and 307 that is coupled to the battery cells 100 may be changed to another one of the first through fourth substrates 205, 305, 207, and 307. For this, the pressurizing body 650 may move upward to allow the belt 960 to return to an original position and then the one substrate coupled to the battery cells 100 may be detached from the battery cells 100. Next, the belt 960 may rotate until the other desired substrate of one of the first through fourth substrates 205, 305, 207, and 307 is positioned above the battery cells 100. Then, the pressurizing body 650 may move downward again to pressurize the belt 960, so that the desired one of the first through fourth substrates 205, 305, 207, and 307 is coupled to the battery cells 100.

Since the battery pack 4 according to the present embodiment may include the first through fourth substrates 205, 305, 207, and 307 having different circuits, the battery pack 4 may control an output voltage of the battery pack 4 to be one of four levels. Also, since the first through fourth substrates 205, 305, 207, and 307 may surround the battery cells 100, the first through fourth substrates 205, 305, 207, and 307 may require relatively less space, compared to a case in which the first through fourth substrates 205, 305, 207, and 307 are arranged in a single direction.

The battery pack according to the embodiments has been described above. However, the battery pack is not limited to the described embodiments, and thus may be embodied in any of various forms.

For example, in the battery packs 1 and 2 according to the previous embodiments, it is described that the first substrates 200 and 201 may connect the battery cells 100 in parallel and the second substrates 300 and 301 may connect the battery cells 100 in series. However, the first substrates 200 and 201 and the second substrates 300 and 301 may connect the battery cells 100 in serial and parallel combination connections.

Also, in the battery pack 1 according to the previous embodiment, it is described that the saw tooth 410 of the integrated substrate 400 may be a rack gear and the rotational gear 710 that is gear-engaged with the toothed portion 410 may be a pinion gear. However, in an implementation, the toothed portion 410 may be a worm gear and the rotational gear 710 may be a worm.

Also, in the battery pack 4 according to one of the embodiments, it is described that the belt 960 and the first through fourth substrates 205, 305, 207, and 307 may be separately arranged. However, the first through fourth substrates 205, 305, 207, and 307 may instead be connected to each other in the form of a belt, or the first through fourth substrates 205, 305, 207, and 307 may instead be formed as one body on a belt.

As described above, according to the above-described embodiments, the connection status of the battery cells may be easily changed. Thus, according to a desired output voltage of the battery pack, an output voltage of the battery pack may be easily changed. The battery pack according to an embodiment without the battery cells connected thereto may be referred to as a battery pack connector.

Also, power loss due to a change of the output voltage may not occur.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
    a plurality of battery cells, the battery cells including positive electrode terminals and negative electrode terminals;
    a first substrate and a second substrate, the first substrate and second substrate being selectively coupleable to the positive electrode terminals and the negative electrode terminals of the plurality of battery cells, wherein:
        the first substrate includes a first circuit for connecting the positive electrode terminals and the negative electrode terminals to selectably connect the plurality of battery cells together in a first manner, and
        the second substrate includes a second circuit for selectably electrically connecting the plurality of battery cells in a second manner different from the first manner, and
    a transport medium for selectively attaching and detaching the first substrate or the second substrate to and from the plurality of battery cells to couple and uncouple the first substrate or the second substrate to the positive electrode terminals and the negative electrode terminals.

2. The battery pack as claimed in claim 1, wherein:
    the first circuit connects each of the positive electrode terminals together and connects each of the negative electrode terminals together to connect the battery cells in parallel, and
    the second circuit connects one of the positive electrode terminals to one of the negative electrode terminals such that the plurality of battery cells is connected in series.

3. The battery pack as claimed in claim 1, wherein the first circuit further connects one of the positive electrode terminals to one of the negative electrode terminals such that some of the plurality of battery cells are connected in series.

4. The battery pack as claimed in claim 1, wherein the first substrate and the second substrate include a plurality of sockets, the positive electrode terminals and the negative electrode terminals being inserted into and coupled to the plurality of sockets.

5. The battery pack as claimed in claim 4, wherein the plurality of sockets includes a plurality of fixed protrusions protruding from inner circumferences of the plurality of sockets, the fixed protrusions pressurizing and fixing the respective positive electrode terminals and negative electrode terminals with respect to the sockets.

6. The battery pack as claimed in claim 5, wherein the plurality of fixed protrusions are formed of an elastic material, the fixed protrusions elastically pressurizing the respective positive electrode terminals or negative electrode terminals.

7. The battery pack as claimed in claim 5, wherein each of the plurality of fixed protrusions extends in a longitudinal direction of the plurality of sockets and has side end portions protruding a distance and a center portion protruding a distance, the distance the side end portions protrude being less than the distance the center portion protrude.

8. The battery pack as claimed in claim 1, wherein the first substrate and the second substrate are fixedly coupled to each other to form a substrate unit.

9. The battery pack as claimed in claim 1, wherein the substrate includes the first substrate and the second substrate formed as one body to form a substrate unit.

10. The battery pack as claimed in claim 1, wherein the transport medium includes:
   a first driving source for selectively attaching and detaching the first substrate or the second substrate to and from the plurality of battery cells; and
   a second driving source for selectively moving the first substrate and the second substrate in a direction perpendicular to a direction in which the first substrate and the second substrate are moved to be attached to or to be detached from the battery cells.

11. The battery pack as claimed in claim 10, wherein:
   the first substrate and the second substrate have a toothed portion at adjacent side ends thereof in a longitudinal direction thereof, and
   the second driving source is for driving a rotational gear that is gear-engaged with the toothed portion to move the first substrate and the second substrate.

12. The battery pack as claimed in claim 11, wherein the toothed portion is a rack gear and the rotational gear is a pinion gear.

13. The battery pack as claimed in claim 11, wherein the toothed portion is a worm gear and the rotational gear is a worm.

14. The battery pack as claimed in claim 1, wherein the first substrate and the second substrate are coupled to each other such that respective surfaces of the first and second substrates that face the plurality of the battery cells face in opposite directions, and
the transport medium includes:
   a first driving source for selectively attaching and detaching the first substrate and the second substrate to and from the plurality of battery cells; and
   a second driving source for turning over the first substrate and the second substrate.

15. The battery pack as claimed in claim 14, further comprising an insulator between the first substrate and the second substrate.

16. The battery pack as claimed in claim 1, wherein:
   the first substrate and the second substrate are formed of a flexible material,
   the battery pack further includes a belt surrounding the plurality of battery cells, the belt being internally coupled with the first substrate and the second substrate, and
   the transport medium includes:
      a belt driving source for rotating the belt; and
      a pressurizing body for selectively pressing the first substrate and the second substrate to couple the first substrate or the second substrate to the positive electrode terminals and the negative electrode terminals.

17. A battery pack connector for interchangeably coupling together positive electrode terminals and negative electrode terminals of a plurality of battery cells, the battery pack connector comprising:
   a first substrate and a second substrate,
      the first substrate including a first circuit for connecting the positive electrode terminals and the negative electrode terminals to selectably connect the plurality of battery cells together in a first manner, and
      the second substrate including a second circuit for selectably electrically connecting the plurality of battery cells in a second manner different from the first manner, and
   a transport medium for selectively attaching and detaching the first substrate or the second substrate to and from the plurality of battery cells to couple and uncouple the first substrate or the second substrate to the positive electrode terminals and the negative electrode terminals.

* * * * *